Aug. 23, 1966     G. S. BERKEBILE     3,268,180

COLLET

Filed May 11, 1964     2 Sheets-Sheet 1

INVENTOR.
Glenn S. Berkebile,
BY Trask, Jenkins & Hanley
Attorneys.

Aug. 23, 1966  G. S. BERKEBILE  3,268,180

COLLET

Filed May 11, 1964  2 Sheets-Sheet 2

INVENTOR.
Glenn S. Berkebile,
BY
Trask, Jenkins & Hanley
Attorneys.

United States Patent Office 3,268,180
Patented August 23, 1966

3,268,180
COLLET
Glenn S. Berkebile, Evansville, Ind., assignor, by mesne assignments, to Fiberfil, Inc., Evansville, Ind., a corporation of Indiana
Filed May 11, 1964, Ser. No. 366,565
4 Claims. (Cl. 242—46.5)

This invention relates to a collet, and has for its objects the provision of an expandable collet which will bindingly retain a spool thereon, and which can be adjusted to fit spools of different diameters.

In accordance with one form of the invention, there is provided a pair of opposed annular heads having aligned axially extending openings formed therein for mounting them on a drive shaft along the collet axis. An annular groove is formed in the inwardly presented face of each of said heads, and a plurality of arcuate, axially extending segments have their ends received in said grooves to define a substantially continuous drum extending between the heads. The ends of said segments have a thickness less than the width of the grooves whereby said segments are radially movable with respect to the collet axis. Conveniently, cooperative means are provided on said heads and segments for circumferentially positioning the segments on the heads and for guiding their radial movements. Means are also provided on the heads for adjustably limiting the outward radial movement of said segments to permit the collet to be used with spools having different diameters.

Other objects and features of the invention will become apparent from the more detailed description which follows and from the accompanying drawings, in which.

Figure 1:
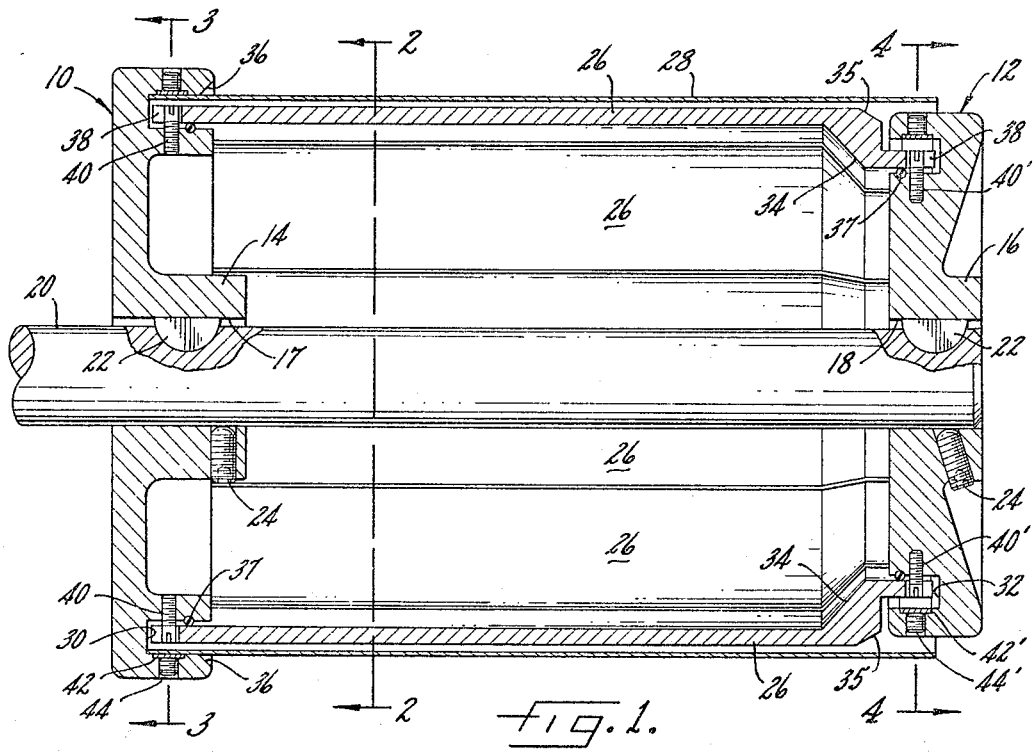
FIG. 1 is an axial section of a collet embodying the invention, and showing its drum segments retracted and a spool mounted thereon.
Figure 2:
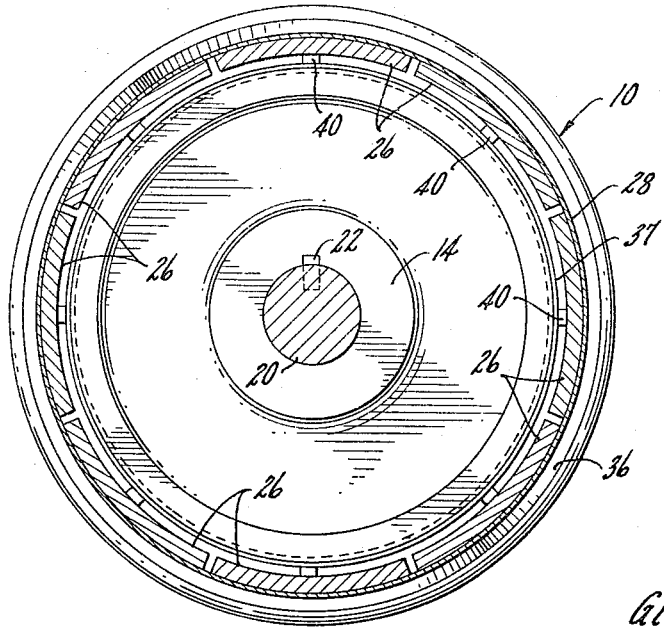
FIG. 2 is a vertical section taken on the line 2—2 of FIG. 1, but with the drum segments in expanded position.
Figure 3:
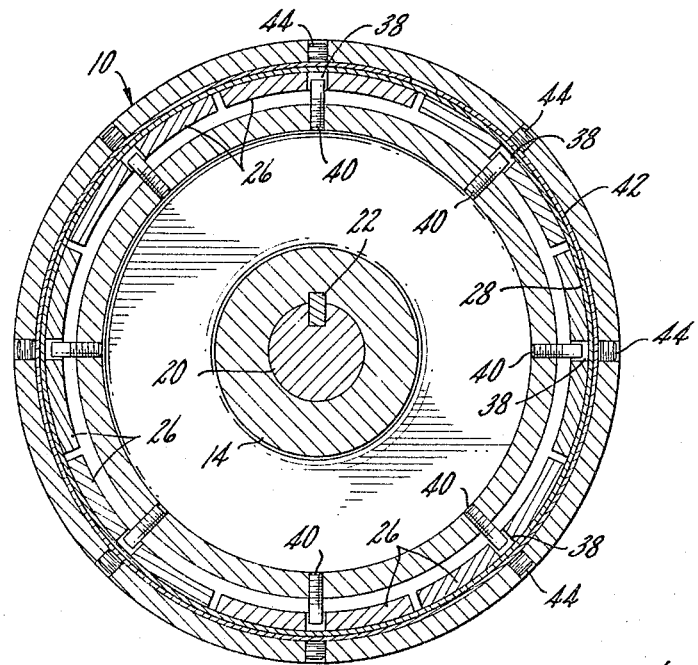
FIG. 3 is a vertical section taken on the line 3—3 of FIG. 1, but with the drum segments in expanded position.
Figure 4:
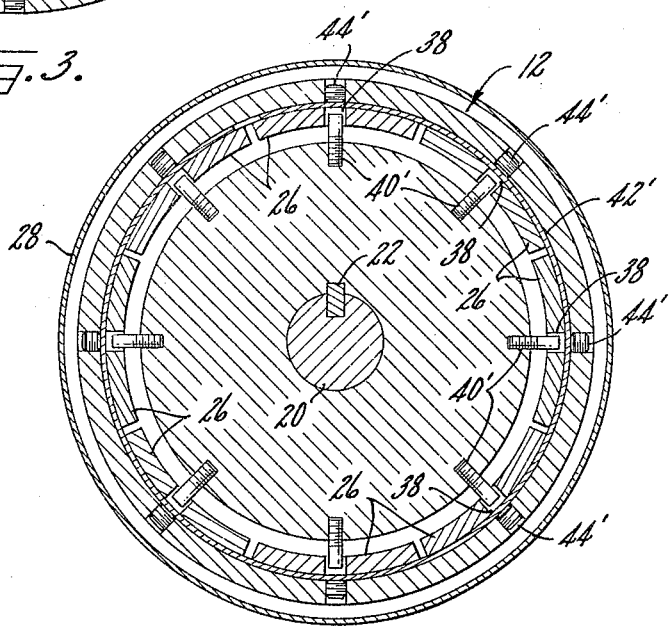
FIG. 4 is a vertical section taken on the line 4—4 of FIG. 1, but with the drum segments in expanded position.

As shown, a pair of heads 10 and 12 provided with central hubs 14 and 16 having axially aligned openings 17 and 18 formed therein are mounted on a drive shaft 20 extending along the collet axis. Each of the heads 10 and 12 is connected to the shaft 20 by a key 22 and set screws 24 for rotation with said shaft.

A plurality of axially extending segments 26 having arcuate cross-sections extend between the head 10 and 12 to define a substantially continuous cylindrical drum for supporting a spool 28 on the collet upon which filaments, strips, or the like may be wound. The segments 26 are identical in construction and each has its opposed ends received in annular grooves 30 and 32 formed in the inwardly presented faces of the heads 10 and 12, respectively. As shown in FIG. 1, the groove 30 has an outer diameter slightly larger than the diameter of the head 12, and the ends of the segments 26 received in the grooves 32 are offset radially inwardly, as at 34, to give the drum formed by said segments a generally cylindrical configuration and a maximum diameter approximating the diameter of the head 12. Conveniently, the offset ends 34 of the segments 26 are chamfered at 35 to facilitate insertion of the spool 28 on the collet. The outer circumference of the groove 30 is also chamfered at 36 to facilitate insertion of one end of the spool in said groove.

As shown in FIG. 1, the ends of the segments 26 have a thickness substantially less than the width of the grooves 30 and 32 to permit the segments to move radially inwardly and outwardly with respect to the collet axis. O-rings 37 are carried in the inner walls of the grooves 30 and 32 to prevent the segments 26 from chattering against the inner groove walls when the segments are moved radially inwardly.

Each of the segments has an inwardly extending slot 38 formed in each of its ends for the reception of pins 40 and 40' mounted in the heads 10 and 12, respectively, and projecting outwardly from the inner walls of the grooves 30 and 32. Pins 40 and 40' are disposed in radial alignment with the slots 38 in each segment 26 to circumferentially position the segments on the collet and to guide their radial movements. The outer walls of the grooves 30 and 32 are provided with annular recesses in which annular spring steel retainer strips 42 and 42' are carried. The diameters of the strips 42 and 42' are reducible to dispose the inner faces of said strips inwardly from the outer walls of the grooves 30 and 32 by pluralities of circumferentially spaced set screws 44 and 44' mounted in the heads 10 and 12 in radial alignment with pins 40 and 40' and projecting inwardly from the outer faces of said heads to engage the strips 42 and 42'. Thus, the strips 42 and 42' serve to adjustably limit the radial outward movement of the segments 26 to prevent splitting of the normally yieldable spool when the collet is rotated, and further serve to control the maximum diameter of the drum formed by said segments so that said segments can be bindingly retained against the inner walls of spools having different diameters.

In the operation of the collet, the strips 42 and 42' are adjusted to cause the diameter of the drum formed by the segments 26 to correspond to the inner diameter of the spool 28. The spool is then placed over the head 12 and moved inwardly on the collet until its inner end is received in the groove 30 and its outer end overlaps the inner margins of the outer face of the head 12. As the collet is rotated to wind a filament, strip, or the like on the spool 28, the segments 26 will be moved radially outwardly by centrifugal force to cause the drum defined thereby to have a diameter approximating the diameter of the head 12. When the segments move outwardly, they bind against the inner face of the spool 28 with the strips 42 and 42' limiting their expansion movements. The pins 40 and 40' received in the segment slots 38 will prevent the segments from rotating with respect to the head and will guide the radial movements of said segments. As rotation of the collet is slowed down and stopped, the segments 26 will move radially inwardly to rest on the O-rings 37 so that the spool 28 with the wound material thereon may be slipped off of the end of the collet.

I claim:
1. A collet, comprising a pair of opposed heads having aligned axially extending openings formed therein for mounting them on a drive shaft along the collet axis, an annular groove formed in the axially inwardly presented face of each head, a plurality of arcuate, axially extending segments having their opposed ends received in said grooves and defining a substantially continuous drum extending between said pair of heads, the ends of said segments having thicknesses less than the widths of said grooves whereby said segments are radially movable with respect to said axis, pluralities of pins projecting radially outwardly from the inner circumferential walls of said grooves, and slots formed in the ends of said segments for the reception of said pins whereby said pins and slots circumferentially position the segments on the heads and guide the radial movements of said segments.

2. A collet, comprising a pair of opposed heads having aligned axially extending openings formed therein for mounting them on a drive shaft along the collet axis, an annular groove formed in the axially inwardly presented face of each head, a plurality of arcuate, axially extending segments having their opposed ends received in said grooves and defining a substantially continuous drum extending between said pair of heads, the ends of said segments having thicknesses less than the widths of said grooves whereby said segments are radially movable with respect to said axis, a retainer strip carried in each of said grooves between the outer circumferential wall of said groove and the adjacent ends of said segments, said retainer strip having an adjustable diameter for adjustably limiting the outward radial movements of said segments, and means for selectively adjusting the diameter of each of said strips.

3. A collet, comprising a pair of opposed heads having aligned axially extending openings formed therein for mounting them on a drive shaft along the collet axis, an annular groove formed in the axially inwardly presented face of each head, a plurality of arcuate, axially extending segments having their opposed ends received in said grooves and defining a substantially continuous drum extending between said pair of heads, the ends of said segments having thicknesses less than the widths of said grooves whereby said segments are radially movable with respect to said axis, an adjustable diameter retainer strip in the form of a split annular resilient strip carried in an annular recess in the outer circumferential wall of each of said grooves, and pluralities of radially adjustable pins mounted in said pairs of heads to project radially inwardly through said recesses to engage said strips for adjusting the strip diameters.

4. A collet, comprising a pair of opposed heads having aligned axially extending openings formed therein for mounting them on a drive shaft along the collet axis, an annular groove formed in the axially inwardly presented face of each head inwardly from the outer head circumference, the diameter of the groove in one of said pair of heads being larger than the diameter of the groove in the other of said pair of heads, a plurality of arcuate, axially extending segments having one of their ends received in the groove in said one head and having their opposite ends offset radially inwardly and received in the groove in said other head to define a substantially continuous drum extending between said pair of heads, the ends of said segments having thicknesses less than the widths of said grooves whereby said segments are radially movable with respect to said axis, the outer diameter of the drum formed by said segments when they are moved radially outward approximating the diameter of said other head and being less than the diameter of said one head, the outer circumferential edge of the larger groove and the offset portions of said segments being chamfered, means in said grooves and segments circumferentially and axially positioning the segments on said heads and guiding the radial movements of said segments, means in each of said grooves for selectively and adjustably limiting the outward radial movements of said segments, and means on said heads for rigidly mounting them on a drive shaft.

References Cited by the Examiner

UNITED STATES PATENTS

| | | |
|---|---|---|
| 2,274,681 | 3/1942 | Fletcher. |
| 2,576,254 | 11/1951 | Fletcher _____ 242—72 X |
| 3,000,585 | 9/1961 | Sokal _____ 242—72 |
| 3,169,718 | 2/1965 | Smith et al. _____ 242—46.5 |

FOREIGN PATENTS 891,964  12/1943  France.

STANLEY N. GILREATH, *Primary Examiner.*